United States Patent
Lee et al.

(10) Patent No.: US 12,009,491 B2
(45) Date of Patent: Jun. 11, 2024

(54) LITHIUM SECONDARY BATTERY

(71) Applicant: SK INNOVATION CO., LTD., Seoul (KR)

(72) Inventors: Sang Han Lee, Daejeon (KR); Yong Hyun Cho, Daejeon (KR); Min Gu Kang, Daejeon (KR); Min Suk Kang, Daejeon (KR); Yoon Ji Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 193 days.

(21) Appl. No.: 17/474,684

(22) Filed: Sep. 14, 2021

(65) Prior Publication Data

US 2022/0085432 A1    Mar. 17, 2022

(30) Foreign Application Priority Data

Sep. 15, 2020 (KR) .................... 10-2020-0118222

(51) Int. Cl.
*H01M 10/52* (2006.01)
*H01M 4/13* (2010.01)
*H01M 4/62* (2006.01)
*H01M 10/0525* (2010.01)
*H01M 4/02* (2006.01)

(52) U.S. Cl.
CPC ............. *H01M 10/52* (2013.01); *H01M 4/13* (2013.01); *H01M 4/628* (2013.01); *H01M 10/0525* (2013.01); *H01M 2004/027* (2013.01)

(58) Field of Classification Search
CPC ........ H01M 10/52; H01M 4/13; H01M 4/628; H01M 10/0525; H01M 2004/027; H01M 10/4235
See application file for complete search history.

(56) References Cited

U.S. PATENT DOCUMENTS

| | | | |
|---|---|---|---|
| 2013/0295441 A1* | 11/2013 | Yoshikawa | H01M 10/0585 429/251 |
| 2016/0013525 A1* | 1/2016 | Yamaguchi | H01M 4/587 429/57 |
| 2018/0226623 A1* | 8/2018 | Cho | H01M 10/0436 |

FOREIGN PATENT DOCUMENTS

| | | | | |
|---|---|---|---|---|
| CN | 111342116 A | * | 6/2020 | |
| JP | 4953525 B2 | | 6/2012 | |
| KR | 10-2012-0042752 A | | 5/2012 | |
| KR | 10-2013-0043734 A | | 5/2013 | |
| KR | 10-2017-0099748 A | | 9/2017 | |
| KR | 10-2019-0142965 A | | 12/2019 | |
| WO | WO-2015119307 A1 | * | 8/2015 | .......... H01M 10/052 |

OTHER PUBLICATIONS

Heo et al. (WO2015119307A1 and using Machine Translation as English version) (Year: 2015).*

(Continued)

*Primary Examiner* — Milton I Cano
*Assistant Examiner* — Joshua P McClure
(74) *Attorney, Agent, or Firm* — IP & T GROUP LLP

(57) ABSTRACT

A lithium secondary battery according to an embodiment of the present invention includes an electrode assembly including a separation layer, and a plurality of cathodes and a plurality of anodes separated by the separation layer and repeatedly stacked, and a gas adsorption layer coated on a single surface of an outermost anode among the plurality of anodes.

5 Claims, 4 Drawing Sheets

(56) References Cited

OTHER PUBLICATIONS

Cao et al. (CN111342116(A) and using Machine Translation as English version) (Year: 2020).*
Purification of Laboratory Chemicals (Chapter 1, Relevant pp. 32-33) (Year: 2022).*

* cited by examiner

LITHIUM SECONDARY BATTERY

CROSS-REFERENCE TO RELATED APPLICATION AND CLAIM OF PRIORITY

This application claims priority to Korean Patent Applications No. 10-2020-0118222 filed on Sep. 15, 2020 in the Korean Intellectual Property Office (KIPO), the entire disclosure of which is incorporated by reference herein.

BACKGROUND

1. Field

The present invention relates to a lithium secondary battery. More particularly, the present invention relates to a lithium secondary battery including an electrode assembly.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, the secondary battery or a battery pack including the same is being developed and applied as an eco-friendly power source of an electric automobile such as a hybrid vehicle.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape.

For example, a gas (e.g., a carbon dioxide) may be generated from the lithium secondary battery due to a chemical reaction of the electrolyte while the lithium secondary battery is operated or charged/discharged at high temperature. To implement a high-capacity and high-power lithium secondary battery, a plurality of battery cells may be connected in series or in parallel to be fabricated as a module. In this case, the gas generation may further frequently occur and an amount of the gas may also be increased.

Thus, a development of a lithium secondary battery capable of providing operational stability and reliability while implementing high capacity and power properties in a limited space is required.

For example, Korean Published Patent Application No. 2017-0099748 discloses an electrode assembly for a lithium secondary battery and a lithium secondary battery including the same.

SUMMARY

According to an aspect of the present invention, there is provided a lithium secondary battery having improved operational stability and reliability.

According to exemplary embodiments, a lithium secondary battery includes an electrode assembly including a separation layer, and a plurality of cathodes and a plurality of anodes separated by the separation layer and repeatedly stacked; and a gas adsorption layer coated on a single surface of an outermost anode among the plurality of anodes.

In some embodiments, each of the anodes may include an anode current collector, and an upper anode active material layer and a lower anode active material layer formed on a top surface and a bottom surface of the anode current collector, respectively.

In some embodiments, the gas adsorption layer may be coated on an anode active material layer that does not face a cathode adjacent to the outermost anode of the upper anode active material layer and the lower anode active material layer.

In some embodiments, the gas adsorption layer may include gas adsorption particles, and an amount of the gas adsorption particles may be from 0.1 wt % to 20 wt % based on a total weight of the anode active material layer that does not face the cathode adjacent to the outermost anode.

In some embodiments, the gas adsorption layer may be coated on a single surface of each of an uppermost anode and a lowermost anode among the anodes included in the electrode assembly.

In some embodiments, the gas adsorption layer may be formed only on the outermost anode among the anodes.

In some embodiments, the gas adsorption layer may include at least one selected from the group consisting of activated carbon, soda lime, zeolite, carboxymethyl cellulose (CMC), diethanol amine (DEA), triethanolamine (TEA), N-methyldiethanolamine (MDEA) and a diene-based compound.

According to exemplary embodiments, a lithium secondary battery includes an electrode assembly, and the electrode assembly includes a separation layer, and a plurality of cathodes and a plurality of anodes separated by the separation layer and repeatedly stacked. Each of the anodes includes an anode current collector, and an upper anode active material layer and a lower anode active material layer formed on a top surface and a bottom surface of the anode current collector, respectively. Gas adsorption particles are dispersed in one of the upper anode active material layer and the lower anode active material layer included in an outermost anode of the anodes.

In some embodiments, the gas adsorption particles may be included in an anode active material layer that does not face the cathode of the upper anode active material layer and the lower anode active material layer.

In some embodiments, an anode active material layer including the gas adsorption particles may be disposed at each of an uppermost portion and a lowermost portion of the electrode assembly.

In some embodiments, the gas adsorption particles may include at least one selected from the group consisting of activated carbon, soda lime, zeolite, carboxymethyl cellulose (CMC) and styrene-butadiene rubber (SBR).

In some embodiments, an amount of the gas adsorption particles may be from 0.1 wt % to 20 wt % based on a total weight of an anode active material layer including the gas adsorption particles.

According to exemplary embodiments, a gas adsorption layer may be formed on at least one of outermost anodes of an electrode assembly included in the lithium secondary battery. In some embodiments, the gas adsorption layer may be formed on each of an uppermost anode and a lowermost anode of the electrode assembly. Accordingly, the gas adsorption layer may adsorb a gas generated at an inside of the battery by repeated charging and discharging of the battery in a high-temperature environment, thereby maintaining power and capacity and improving life-span and stability of the battery.

According to exemplary embodiments, gas-absorbing particles may be included on an anode active material layer that may not face a cathode adjacent to the outermost anode of the electrode assembly. In some embodiments, the gas absorbing particles may be included in an upper anode active material layer of the uppermost anode and a lower anode active material layer of the lowermost anode. Accordingly, the gas adsorbing particles may adsorb the gas at the inside of the battery generated in the repeated charging and discharging of the battery and in the high-temperature environment, thereby maintaining power and capacity and improving life-span and stability of the battery.

In some embodiments, the gas adsorption layer or the anode active material layer including the gas adsorption particles may not face the cathode. Accordingly, a lithium-ion exchange between the cathode and the anode may be facilitated, thereby maintaining power and capacity and improving life-span and stability of the battery.

DETAILED DESCRIPTION OF THE EMBODIMENTS

According to embodiments of the present invention, a lithium secondary battery that includes an electrode assembly including a plurality of cathodes and anodes, and a gas adsorption layer coated on at least one of the plurality of anodes to provide improved life-span and operational stability is provided.

Hereinafter, embodiments of the present invention will be described in detail with reference to accompanying drawings. However, the embodiments disclosed herein are exemplary and the present invention is not limited to specific embodiments.

The terms "upper" and "lower" used herein are not intended to limit an absolute position or location, but are used to relatively distinguish different elements or objects.

Figure 1:
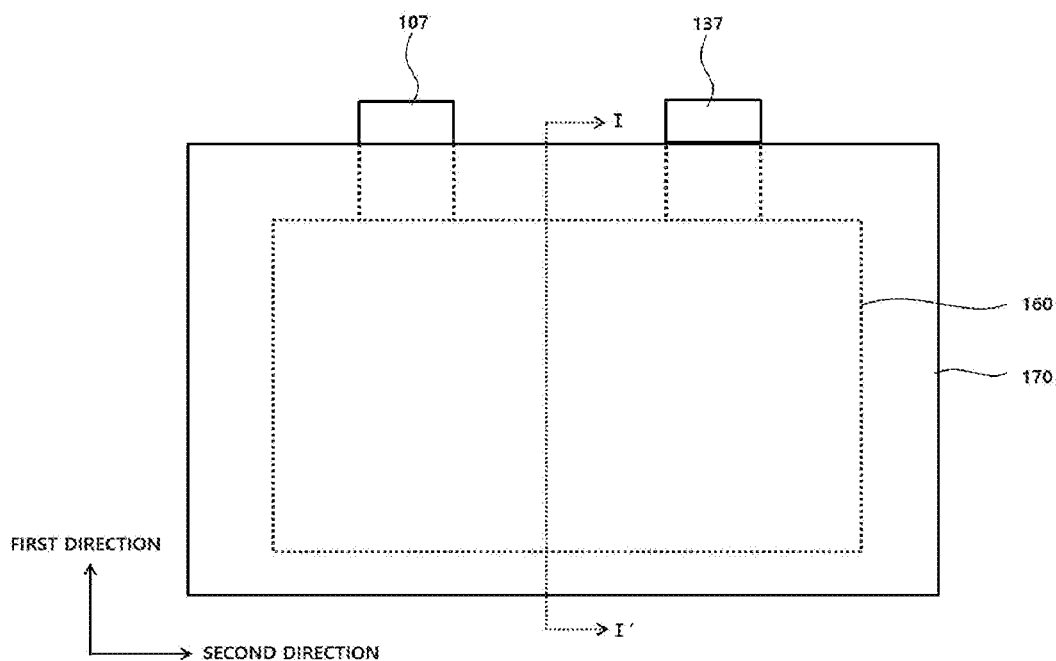
FIGS. 1 and 2 are schematic top planar view and cross-sectional view, respectively, illustrating a lithium secondary battery in accordance with exemplary embodiments.
Figure 2:
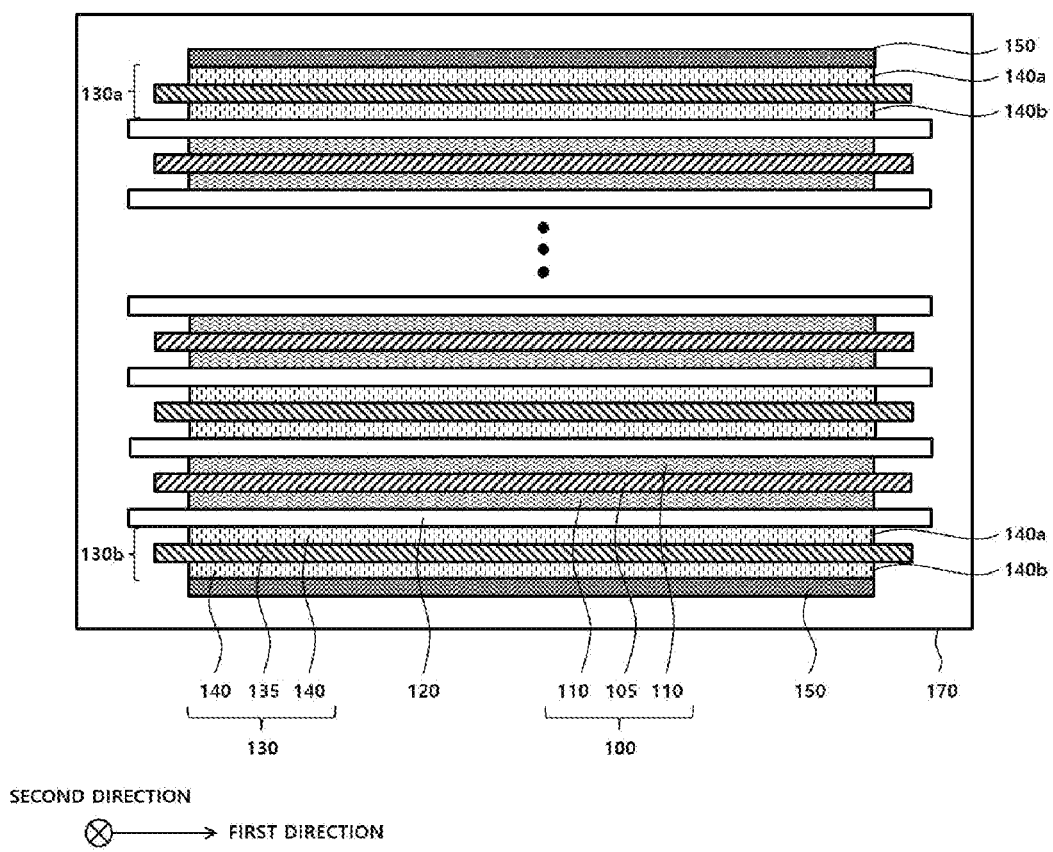

FIGS. 1 and 2 are schematic top planar view and cross-sectional view, respectively, illustrating lithium secondary batteries in accordance with exemplary embodiments. For example, FIG. 2 is a cross-sectional view taken along a line I-I' of FIG. 1 in a thickness direction of the lithium secondary battery.

In FIGS. 1 and 2, two directions perpendicular to each other on a plane are defined as a first direction and a second direction. For example, the first direction may be a length direction of the lithium secondary battery, and the second direction may be a width direction of the lithium secondary battery.

For convenience of descriptions, an illustration of a cathode and an anode omitted in FIG. 1.

Referring to FIGS. 1 and 2, a lithium secondary battery may include an electrode assembly 160 including a cathode 100, an anode 130 and a separation layer 120 interposed between the cathode and the anode. The electrode assembly 160 may be accommodated and impregnated with an electrolyte in a case 170.

The cathode 100 may include a cathode current collector 105 and a cathode active material layer 110 formed on at least one surface of the cathode current collector 105. In exemplary embodiments, the cathode active material layer 110 may be formed on both surfaces (e.g., upper and lower surfaces) of the cathode current collector 105.

The cathode current collector 105 may include stainless-steel, nickel, aluminum, titanium, copper or an alloy thereof. Preferably, aluminum or an alloy thereof may be used.

For example, a cathode slurry may be prepared by mixing and stirring a cathode active material as described above in a solvent with a binder, a conductive agent and/or a dispersive agent. The cathode slurry may be coated on the cathode current collector 105, and then dried and pressed to form the cathode active material layer 110.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 110 may be reduced, and an amount of the cathode active material or the lithium metal oxide particle may be relatively increased. Thus, capacity and power of the lithium secondary battery may be further improved.

The conductive agent may be added to facilitate electron mobility between active material particles. For example, the conductive agent may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The cathode active material layer 110 may include a lithium metal oxide as the cathode active material. In exemplary embodiments, the cathode active material may include a lithium (Li)-nickel (Ni)-based oxide.

In some embodiments, the lithium metal oxide included in the cathode active material layer 110 may be represented by Chemical Formula 1 below.

$$Li_{1+a}Ni_{1-31\,(x+y)}Co_xM_yO_2 \qquad \text{[Chemical Formula 1]}$$

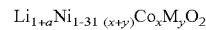

In Chemical Formula 1, $-0.1 \leq a \leq 0.2$, $0.01 \leq x \leq 0.2$, $0 \leq y \leq 0.2$, and M may include at least one element selected from the group consisting of Mg, Sr, Ba, B, Al, Si, Mn, Ti, Zr and W. In an embodiment, $0.01 \leq x \leq 0.20$, $0.01 \leq y \leq 0.15$.

Preferably, in Chemical Formula 1, M may include manganese (Mn). In this case, nickel-cobalt-manganese (NCM)-based lithium oxide may be used as the cathode active material.

For example, nickel (Ni) may serve as a metal related to capacity of a lithium secondary battery. As a content of nickel increases, capacity and power of the lithium secondary battery may be improved. However, if the content of nickel is excessively increased, life-span, mechanical and electrical stability may be degraded.

For example, cobalt (Co) may serve as a metal related to conductivity or resistance of the lithium secondary battery.

In an embodiment, manganese (Mn) may serve as a metal related to mechanical and electrical stability of the lithium secondary battery.

High capacity, high power, low resistance and life-span stability may be improved together from the cathode active material layer 110 using the above-described interaction between nickel, cobalt, and manganese.

In exemplary embodiments, the anode 130 may include an anode current collector 135 and an anode active material layer 140 formed at least one surface of the anode current collector 135. In exemplary embodiments, the anode active material layer 140 may include an upper anode active material layer 140a formed on a top surface of the anode current collector 135 and a lower anode active material layer 140b formed on a bottom surface of the anode current collector 135.

The anode current collector 135 may include gold, stainless steel, nickel, aluminum, titanium, copper, or an alloy thereof, preferably may include copper or a copper alloy.

For example, a slurry may be prepared by mixing and stirring an anode active material with a binder, a conductive agent and/or a dispersive agent in a solvent. The slurry may be coated on the anode current collector 135, and then dried and pressed to form the anode active material layer 140.

The anode active material may include a material commonly used in the related art which may be capable of adsorbing and ejecting lithium ions. For example, a carbon-based material such as a crystalline carbon, an amorphous carbon, a carbon complex or a carbon fiber, a lithium alloy, silicon (Si)-based compound, tin, etc., may be used.

The amorphous carbon may include a hard carbon, cokes, a mesocarbon microbead (MCMB) fired at a temperature of 1,500° C. or less, a mesophase pitch-based carbon fiber (MPCF), etc.

The crystalline carbon may include a graphite-based material such as natural graphite, graphitized cokes, graphitized MCMB, graphitized MPCF, etc. The lithium alloy may further include aluminum, zinc, bismuth, cadmium, antimony, silicon, lead, tin, gallium, indium, etc.

The silicon-based compound may include, e.g., a silicon-carbon composite compound such as silicon oxide or silicon carbide (SiC).

The binder and the conductive agent substantially the same as or similar to those used for the cathode 100 may also be used for the anode 130. In some embodiments, the binder for forming the anode 130 may include, e.g., an aqueous binder such as styrene-butadiene rubber (SBR) for compatibility with the carbon-based active material that may be used with a thickener such as carboxymethyl cellulose (CMC).

In some embodiments, an area and/or a volume of the anode 130 (e.g., a contact area with the separation layer 120) may be greater than that of the cathode 100. Thus, lithium ions generated from the cathode 100 may be easily transferred to the anode 130 without a loss by, e.g., precipitation or sedimentation to further power and capacity.

The separation layer 120 may be interposed between the cathode 100 and the anode 130. The separation layer 120 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 120 may also include a non-woven fabric formed from a glass fiber with a high melting point, a polyethylene terephthalate fiber, or the like.

The separation layer 120 may extend in a second direction between the cathode 100 and the anode 130, and may be folded and wound along a thickness direction of the lithium secondary battery. Accordingly, a plurality of the anodes 100 and the cathodes 130 may be stacked in the thickness direction by the separation layer 120.

For example, an electrode cell may be defined by the anode 100 and the cathode 130 facing each other with a portion of the separation layer 120 extending in the second direction interposed therebetween, and a plurality of the electrode cells may be stacked with the separation layer 120 interposed therebetween to define an electrode assembly 160. The electrode assembly 160 may have, e.g., a jelly roll shape.

The electrode assembly 160 may be accommodated together with an electrolyte in a case 170. The case 170 may include, e.g., a pouch, a can, etc.

In exemplary embodiments, a non-aqueous electrolyte may be used as the electrolyte.

For example, the non-aqueous electrolyte solution may include a lithium salt and an organic solvent. The lithium salt and may be represented by $Li^+X^-$.

An anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 1, a first electrode lead 107 and a second electrode lead 137 may protrude to an outside of the case 170.

In exemplary embodiments, cathode tabs may branch and extend in a first direction from each cathode current collector 105. The cathode tabs may overlap in the thickness direction of the lithium secondary battery, and may be fused together with the case 170 at one end portion thereof. The fused cathode tabs may be substantially integrally merged and may be drawn out of the case 170 to form the first electrode lead 107.

The anode tabs may branch and extend in the first direction from each anode current collector 135. The anode tabs may overlap in the thickness direction of the lithium secondary battery, and may be fused together with the case 170 at the one end portion thereof. The fused anode tabs may be substantially integrally merged and drawn out of the case 170 to form the second electrode lead 137.

FIG. 1 illustrates that the first electrode lead 107 and the second electrode lead 137 are formed at the same side of the lithium secondary battery or case 170, but the first electrode lead 107 and the second electrode lead 137 may be formed at opposite sides to each other.

For example, the first electrode lead 107 may be formed at the one end portion of the case 170, and the second electrode lead 137 may be formed at the other end portion of the case 170.

As illustrated in FIG. 2, the anode 130 may be disposed at an outermost portion of the electrode assembly 160 including a plurality of the electrode cells therein.

In exemplary embodiments, a gas adsorption layer 150 may be formed on an outermost anodes 130a and 130b of the electrode assembly 160. The gas adsorption layer 150 may be formed as a single-face coating layer of the outermost anode 130a and 130b.

For example, the gas adsorption layer 150 may adsorb gas (e.g., $CO_2$ gas) at an inside the lithium secondary battery generated during charging/discharging under a high-temperature environment to prevent a volume expansion of the lithium secondary battery. Accordingly, an initial capacity of the battery may be improved, and a life-span during the charging/discharging under the high-temperature environment may be improved.

In some embodiments, the gas adsorption layer 150 may not be formed as a bi-facial coating of the outermost cathodes 130a and 130b. For example, the gas adsorption layer 150 may be formed as the single-face coating of the anode active material layer 140 that may not face the cathode 100 adjacent to the outermost anode 130a and 130b. In this case, when being compared to a case of a comparative example as will be described below, a lithium-ion exchange between the cathode 100 and the anode 130 may be facilitated so that power and capacity of the battery and life-span stability at the high temperature may be improved.

In some embodiments, the gas adsorption layer 150 may be coated on one side of each of an uppermost anode 130a and a lowermost cathode 130b of the electrode assembly 160. In this case, the two gas adsorption layers 150 may be included, so that a gas adsorption capacity may be increased, and thus a capacity retention rate and the life-span property at the high temperature of the lithium secondary battery may be further improved.

In some embodiments, the gas adsorption layer 150 may include an activated carbon, soda lime, zeolite (Zeolite), carboxymethyl cellulose (CMC), diethanol amine (DEA), triethanol amine (TEA), an amine-based compound such as N-methyldiethanol amine (MDEA), a diene-based compound such as styrene-butadiene rubber (SBR), etc. These may be used alone or in a combination thereof.

In some embodiments, the gas adsorption layer 150 may include gas adsorption particles. For example, the weight of the gas adsorption particles included in the gas adsorption layer 150 may be from 0.1 wt % to 20 wt %.

In the above weight range, mobility of lithium ions may be facilitated to prevent a reduction of the power/capacity from the anode active material layer 140, and an enhanced gas adsorption effect may be provided while suppressing a deterioration of an electrolyte impregnation property. Accordingly, the power and capacity of the lithium secondary battery maybe maintained while reducing an amount of gas generation to improve the life-span of the battery.

In some embodiments, a portion of the gas adsorption particles included in the gas adsorption layer 150 may be absorbed and included in the anode active material layer 140 facing or contacting the gas adsorption layer 150. For example, the gas adsorption material included in the gas adsorption layer 150 may be partially absorbed and included by the anode active material layer 140 that may not face the cathode 100 adjacent to the outermost anode 130a and 130b of the electrode assembly 160.

In some embodiments, the gas adsorption layer 150 may be formed only on the outermost anodes 130a and 130b among the anodes 130 stacked in the electrode assembly 160. When the gas adsorption layer 150 is formed on the anode other than the outermost anodes 130a and 130b, a distance of transferring lithium ions at the inside of the battery becomes increased. Thus, insertion/desorption of lithium ions may not easily occur to cause degradation of initial capacity and power of the battery.

Figure 3:
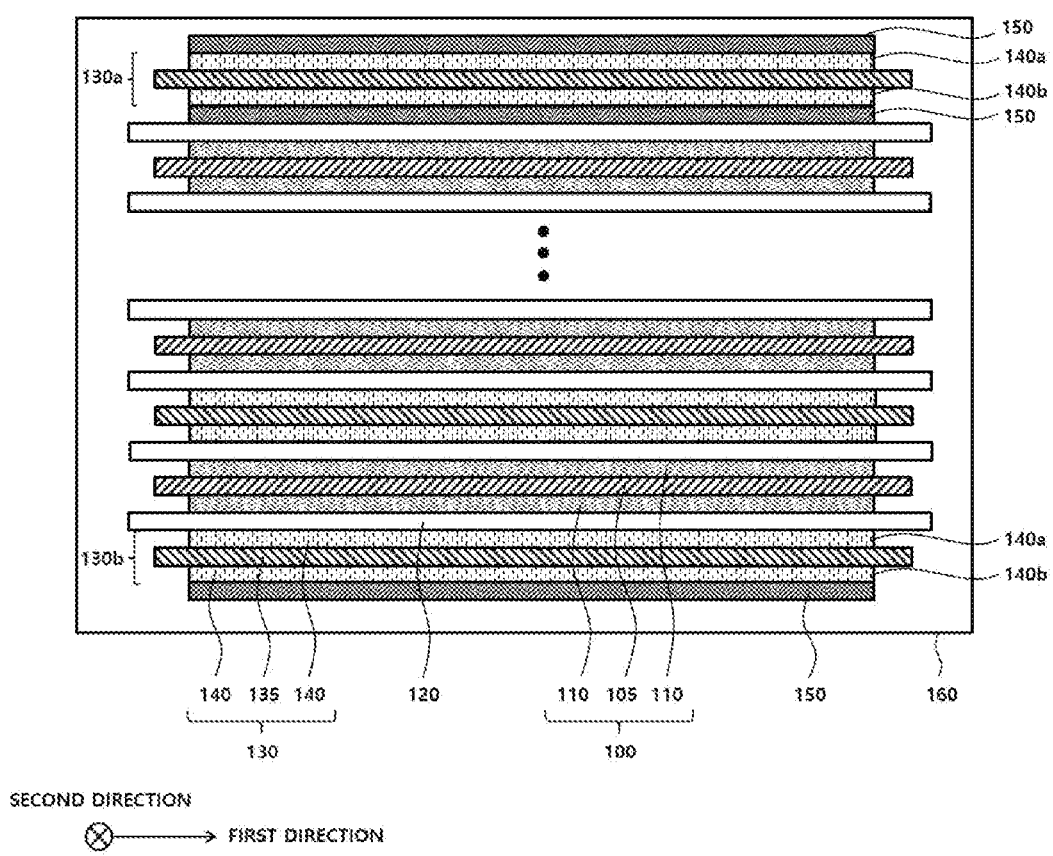
FIG. 3 is a schematic cross-sectional view illustrating a lithium secondary battery in accordance with a comparative example.

FIG. 3 is a schematic cross-sectional view illustrating a lithium secondary battery according to a comparative example.

Referring to FIG. 3, according to a comparative example, the gas adsorption layer 150 may be coated on both sides of at least one of the outermost cathodes 130a and 130b of the electrode assembly 160. In this case, the gas adsorption layer 150 may be formed on a top upper surface of the upper anode active material layer 140a of the outermost anodes 130a and 130b and a bottom surface of the lower anode active material layer 140b of the outermost anodes 130a and 130b.

In this case, the gas adsorption layer 150 coated on the anode active material layer 140 facing the cathode 100 adjacent to the outermost anode 130a and 130b is formed between the cathode 100 and the anode 130 to interfere with a lithium-ion exchange and deteriorate a capacity retention at high temperature of the lithium secondary battery.

Figure 4:
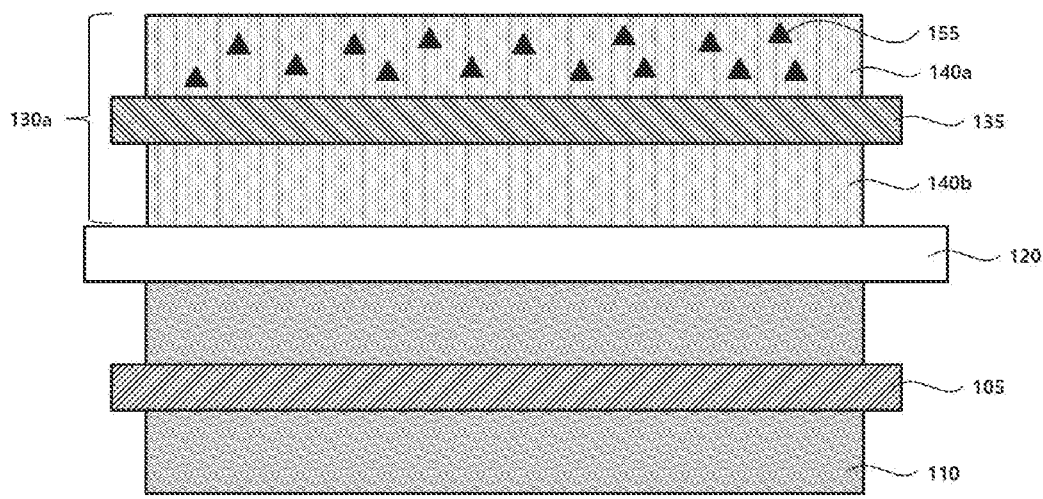
FIGS. 4 and 5 are schematic cross-sectional views illustrating electrode cells of a lithium secondary battery in accordance with exemplary embodiments.
Figure 5:
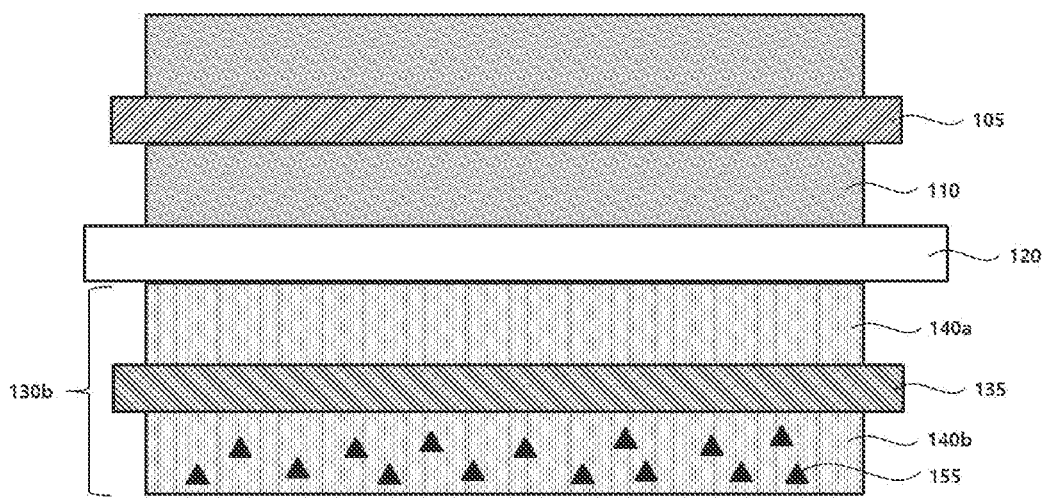

FIGS. 4 and 5 are schematic cross-sectional views illustrating electrode cells of a lithium secondary battery in accordance with exemplary embodiments.

Referring to FIGS. 4 and 5, gas adsorption particles 155 may be dispersed in one anode active material layer of the upper anode active material layer 140a and the lower anode active material layer 140b included in the outermost anode 130a and 130b of the electrode assembly 160. For example, the gas adsorption particles 155 may be mixed together with anode active material particles, a binder, a conductive agent, etc., to be included in the anode active material layer 140 of the outermost anodes 130a and 130b. In this case, an additional gas adsorption layer may not be formed.

For example, the gas adsorption particles 155 may adsorb a gas (e.g., CO2 gas) at an inside of the lithium secondary battery generated during charging/discharging and in a high-temperature environment to prevent a volume expansion of the lithium secondary battery. Accordingly, an initial capacity of the battery may be improved, and the life-span during the charge/discharge and in the high-temperature environment may be improved.

For example, the gas adsorption particles 155 may be included in the anode active material layer 140 of the upper anode active material layer 140a and the lower anode active material layer 140b included in the outermost anode 130a and 130b which may not face the cathode 100 adjacent to the outermost anode 130a and 130b. In this case, the lithium-ion exchange between the cathode 100 and the anode 130 may not be interfered by the gas adsorption particles 155 so that lithium-ion insertion/desorption may be facilitated. Accordingly, deterioration of the initial capacity and power may be prevented.

In some embodiments, the adsorbent particles 155 may be mixed and included in each of the upper anode active material layer 140a of the uppermost anode 130a and the lower anode active material layer 140b of the lowermost anode 130b. In this case, a total content of the gas adsorption particles 155 in the secondary battery may be increased, so that a gas adsorption may be enhanced and thus the capacity retention and life-span at the high temperature of the lithium secondary battery may be further improved.

The gas adsorption particles 155 may include, e.g., activated carbon, soda lime, zeolite, carboxymethyl cellulose (CMC), diene-based compound such as styrene-butadiene rubber (SBR). These may be used alone or in a combination thereof.

In exemplary embodiments, a slurry may be prepared by mixing and stirring an anode active material in a solvent with a binder, a conductive agent, a dispersive agent, an adsorbent, etc. The slurry may be coated on the anode current collector 135, and dried and pressed to form the anode active material layer 140 including the gas adsorption particles 155.

In some embodiments, an amount of the adsorption particles 155 included in the anode active material layer 140 may be from 0.1 weight percent (wt %) to 20 wt % based on a total weight of the anode active material layer 140 including the gas adsorption particles 155.

For example, in the above range, the gas adsorption performance of the adsorption particles 155 may be enhanced while preventing a volume increase in the secondary battery due to an excessive thickness increase of the anode active material layer 140.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLE 1

Fabrication of Cathode $LiNi_{0.8}Co_{0.1}Mn_{0.1}O_2$ as a cathode active material, carbon black as a conductive agent, and polyvinylidene fluoride (PVDF) as a binder were input and mixed in NMP (n-methyl 2-pyrrolidone (NMP)) with a mass ratio of 92:5:3, and a slight amount of NMP was further used to adjust a viscosity to prepare a cathode slurry. The cathode slurry was coated on both sides of an aluminum substrate, and dried and pressed to form a cathode active material layer (130 μm).

Fabrication of Anode 92 wt % of artificial graphite as an anode active material, 2 wt % of styrene-butadiene rubber (SBR)-based binder, 1 wt % of CMC as a thickener and 5 wt % of a flake-type amorphous graphite as a conductive agent were dissolved and mixed in water, and artificial graphite and water were further added/mixed to prepare an anode slurry. The anode slurry was coated on both sides of a copper substrate, and dried and pressed to form an anode active material layer (140 μm).

Formation of Gas Adsorption Layer

A composition including 10 wt % of activated carbon as gas adsorption particles, 80 wt % of zeolite, 5 wt % of CMC and 5 wt % of SBR was used to form a gas adsorption layer. Specifically, CMC and SBR were dissolved in water and mixed, and then activated carbon, zeolite and water were added and mixed to prepare a slurry. The slurry was applied to a top surface of an upper anode active material layer of an uppermost anode in the electrode assembly and a bottom surface of a lower anode active material layer of a lowermost anode in the electrode assembly, and then dried to form a gas adsorption layer.

A total weight of the gas adsorption particles was 10% of a total weight of the anode active material layer facing the gas adsorption layer.

Fabrication of Lithium Secondary Battery

An electrode cell was formed by disposing the anode and cathode prepared above with a polyethylene (PE) separator (25 μm) interposed therebetween, and the anode and cathode were stacked to form an electrode assembly. When forming the electrode assembly, the anode including the gas adsorption layer was disposed at an outermost side such that the gas adsorption layer faced an outside of the cell.

The electrode assembly was accommodated in a pouch and electrode tab portions were fused. Thereafter, an electrolyte solution was injected and sealed to prepare a lithium secondary battery.

After preparing a 1M $LiPF_6$ solution with a mixed solvent of ethylene carbonate/ethylmethyl carbonate/diethyl carbonate (EC/EMC/DEC, 25/45/30; volume ratio), 1 wt % of vinylene carbonate (VC), 0.5 wt % of 1,3-propensultone (PRS) and 0.5 wt % of lithium bis(oxalato)borate (LiBOB) were added to be used as the electrolyte solution.

EXAMPLE 2

A lithium secondary battery was manufactured by the same method as that in Example 1, except that the gas adsorption layer was formed only on a top surface of the upper anode active material layer (that did not face the cathode) of the uppermost anode of the electrode assembly.

EXAMPLE 3

Fabrication of Cathode $LiNi_{0.8}Co_{0.1}Mn_{0.1}O_2$ as a cathode active material, carbon black as a conductive agent, and polyvinylidene fluoride (PVDF) as a binder were prepared with a mass ratio of 92:5:3. The binder was dissolved in NMP (n-methyl 2-pyrrolidone (NMP)), and then the conductive agent was added and dispersed. Thereafter, the cathode active material and NMP were input, and a slight amount of NMP was further used to adjust a viscosity to prepare a cathode slurry. The cathode slurry was coated on both sides of an aluminum substrate, and dried and pressed to form a cathode active material layer (130 μm).

Fabrication of Anode 92 wt % of artificial graphite as an anode active material, 2 wt % of styrene-butadiene rubber (SBR)-based binder, 1 wt % of CMC as a thickener and 5 wt % of a flake-type amorphous graphite as a conductive agent used to form an anode slurry. The anode slurry was coated on a copper substrate, and then dried and pressed to form a first anode active material layer (140 μm). The first anode active material layer was not formed on a top surface of a copper substrate included in the uppermost anode of the electrode assembly and a bottom surface of a copper substrate included in the lowermost anode 92 wt % of artificial graphite as an anode active material, 2 wt % of styrene-butadiene rubber (SBR)-based binder, 1 wt % of CMC as a thickener and 5 wt % of a flake-type amorphous graphite as a conductive agent used to form an anode slurry. Specifically, SBR and CMC were dissolved and mixed in water, and then mixed with artificial graphite and the conductive agent dissolved in water to form the anode slurry. A gas adsorbent in which activated carbon and zeolite were mixed in a weight ratio of 1:1 was added by an amount of 10 wt % based on a total weight of the anode active material, the binder, the conductive agent and thickener, and mixed to prepare a gas adsorption anode slurry. The gas adsorption anode slurry was coated, dried and pressed on the top surface of the copper substrate included in the uppermost anode of the electrode assembly and the bottom surface of the copper substrate included in the lowermost anode to form a second anode active material layer (150 μm).

Fabrication of Lithium Secondary Battery

An electrode cell was formed by disposing the anode and cathode prepared above with a polyethylene (PE) separator (25 μm) interposed therebetween, and the electrode cells was stacked such that uppermost and lowermost layers were anodes to form an electrode assembly. The electrode assembly was accommodated in a pouch and electrode tab portions were fused. Thereafter, an electrolyte solution was injected and sealed to prepare a lithium secondary battery.

After preparing a 1M $LiPF_6$ solution with a mixed solvent of ethylene carbonate/ethylmethyl carbonate/diethyl carbonate (EC/EMC/DEC, 25/45/30; volume ratio), 1 wt % of vinylene carbonate (VC), 0.5 wt % of 1,3-propensultone (PRS) and 0.5 wt % of lithium bis(oxalato)borate (LiBOB) were added to be used as the electrolyte solution.

EXAMPLE 4

A lithium secondary battery was fabricated by the same method as that in Example 3, except that the gas adsorbent was included only in the preparation of the upper anode active material layer of the uppermost anode included in the electrode assembly.

Comparative Example 1

A lithium secondary battery was manufactured by the same method as that in Example 1, except that the gas adsorption layer was not formed.

Comparative Example 2

A lithium secondary battery was fabricated by the same method as that in Example 1, except that the gas adsorption slurry was additionally coated on the lower anode active material layer of the uppermost anode included in the electrode assembly to further form a gas adsorption layer.

Comparative Example 3

A lithium secondary battery was fabricated by the same method as that in Example 1, except that the gas adsorption slurry was additionally applied to the lower anode active material layer of the uppermost anode included in the electrode assembly to further form a gas adsorption layer, and the gas adsorption layer was not formed on the lowermost anode in the electrode assembly.

Comparative Example 4

A lithium secondary battery was fabricated by the same method as that in Example 1, except that the gas adsorption layer was not formed on the uppermost anode in the electrode assembly, and the gas adsorption slurry was coated on an upper anode active material layer of an anode (referred to as a middle anode) located under the cathode adjacent to the uppermost anode to form a gas adsorption layer.

Comparative Example 5

A lithium secondary battery was fabricated by the same method as that in Example 3, except that the anode slurry including the gas adsorbent was coated on a bottom surface of the copper substrate of the uppermost anode included in the electrode assembly, and then dried and pressed to form a lower anode active material layer facing the cathode.

Comparative Example 6

A lithium secondary battery was fabricated by the same method as that in Example 3, except that the anode slurry including the gas adsorbent was coated, dried and pressed on top and bottom surfaces of the copper substrate of the uppermost anode included in the electrode assembly to form an upper anode active material layer that did not face the cathode and a lower anode active material layer facing the cathode, and the gas adsorbent was not used when forming the anode active material layer of the lowermost anode included in the electrode assembly.

Constructions of Examples and Comparative Examples are summarized as shown in Tables 1 and 2 below.

TABLE 1

|  |  |  | Example 1 | Example 2 | Comparative Example 1 | Comparative Example 2 | Comparative Example 3 | Comparative Example 4 |
|---|---|---|---|---|---|---|---|---|
| Formation of Gas Adsorption layer | Uppermost Anode | Top surface of upper anode active material layer | O | O | X | O | O | X |
|  |  | Bottom surface of lower anode active material layer | X | X | X | O | O | X |
|  | Middle Anode | Top surface of upper anode active material layer | X | X | X | X | X | O |

TABLE 1-continued

|  |  | Example 1 | Example 2 | Comparative Example 1 | Comparative Example 2 | Comparative Example 3 | Comparative Example 4 |
|---|---|---|---|---|---|---|---|
| Lowermost Anode | Top surface of upper anode active material layer | X | X | X | X | X | X |
|  | Bottom surface of lower anode active material layer | O | X | X | O | X | O |

TABLE 2

|  |  |  | Example 3 | Example 4 | Comparative Example 1 | Comparative Example 5 | Comparative Example 6 |
|---|---|---|---|---|---|---|---|
| Inclusion of Gas Adsorption Particles | Uppermost Anode | Upper anode active material layer | O | O | X | O | O |
|  |  | Lower anode active material layer | X | X | X | O | O |
|  | Lowermost Anode | Upper anode active material layer | X | X | X | X | X |
|  |  | Lower anode active material layer | O | X | X | O | X |

Experimental Example (1) Measurement of Initial Charging/Discharging Capacities and Initial Capacity Efficiency The lithium secondary batteries prepared according to the above-described Examples and Comparative Examples were charged (CC-CV 1.0 C 4.2V 0.05 C CUT-OFF) in a 45° C. chamber to measure a capacity (an initial charge capacity), and then discharged (CC 1.0 C 2.7V CUT-OFF) to measure a capacity (am initial discharge capacity).

An initial capacity efficiency was calculated as a percentage of the measured initial discharge capacity relative to the measured initial charge capacity.

(2) DCIR Measurement at Room Temperature

The lithium secondary batteries prepared according to the above-described Examples and Comparative Examples were charged/discharged twice (SOC 100%) at 25° C. under a condition of 0.5 C CC-CV, and then charged under the 0.5 C CC-CV condition and discharged under 0.5 C condition to a point of SOC 50%. Thereafter, after being left for 30 minutes, a voltage (a first voltage) was measured.

Then, a voltage (a second voltage) was measured after i) 1 C, discharged for 10 seconds, left for 40 seconds, ii) 0.75 C, charged for 10 seconds and left for 40 seconds. DCIR was measured using a difference between the first voltage and the second voltage.

(3) Measurement of Life-Span During Charging and Discharging at 25° C. and 45° C. (Capacity Retention Ratio)

Charging (CC-CV 1.0 C 4.2V 0.05 C CUT-OFF) and discharging (CC 1.0 C 2.7V CUT-OFF) of the lithium secondary batteries prepared according to the above-described Examples and Comparative Examples were repeated 500 times in 25° C. and 45° C. chambers. A capacity retention ratio was calculated as a percentage of a discharge capacity at the 500th cycle relative to the discharge capacity at the 1st cycle.

(4) Measurement of Life-Span After Being Stored at 60° C. (Capacity Retention Ratio)

The lithium secondary batteries prepared according to the above-described Examples and Comparative Examples were charged (1 C 4.2V 0.1 C CUT-OFF) and discharged (CC 1.0 C 2.7V CUT-OFF) to measure an initial discharge capacity. The batteries were charged again (1 C 4.2V 0.1 C CUT-OFF), stored in a constant temperature chamber at 60° C. for 16 weeks, and then the discharge capacity was measured. A capacity retention ratio was calculated as a percentage of a discharge capacity after 16 weeks relative to the initial discharge capacity.

(5) Measurement of Gas Generation After Repeated Charging and Discharging

Charging (CC-CV 1.0 C 4.2V 0.05 C CUT-OFF) and discharging (CC 1.0 C 2.7V CUT-OFF) of the lithium secondary batteries prepared according to the above-described Examples and Comparative Examples were repeated 300 times in 45° C. chamber, and then an amount of gas generation was measured using a gas chromatography (GC) analysis. Specifically, a hole was formed in the chamber having a predetermined volume (V) at a vacuum state, and a pressure change was measured to calculate a gas generation volume.

The evaluation results are shown in Tables 3 and 4 below.

TABLE 3

|  | Initial Charge Capacity (Ah) | Initial Discharge Capacity (Ah) | Initial Capacity Efficiency (%) | DCIR (mΩ) |
|---|---|---|---|---|
| Example 1 | 21.895 | 19.612 | 89.6 | 4.09 |
| Example 2 | 21.911 | 19.613 | 89.5 | 4.07 |
| Example 3 | 21.912 | 19.589 | 89.4 | 4.06 |
| Example 4 | 21.895 | 19.599 | 89.5 | 4.09 |
| Comparative Example 1 | 21.936 | 19.602 | 89.4 | 4.07 |
| Comparative Example 2 | 22.013 | 18.512 | 84.1 | 4.65 |
| Comparative Example 3 | 21.912 | 19.032 | 86.9 | 4.60 |
| Comparative Example 4 | 21.881 | 18.708 | 85.5 | 4.59 |
| Comparative Example 5 | 21.891 | 19.212 | 87.8 | 4.37 |
| Comparative Example 6 | 21.879 | 19.311 | 88.3 | 4.32 |

TABLE 4

|  | Capacity Retention Ratio at 25° C. (%) | Capacity Retention Ratio at 45° C. (%) | Capacity Retention Ratio after storage at 60° C. (%) | Gas Generation (mL) |
|---|---|---|---|---|
| Example 1 | 85.9 | 84.3 | 92.1 | 9.73 |
| Example 2 | 86.2 | 82.9 | 89.5 | 15.16 |
| Example 3 | 85.1 | 81.9 | 88.2 | 11.71 |
| Example 4 | 85.4 | 81.3 | 87.3 | 17.85 |
| Comparative Example 1 | 85.6 | 73.2 | 72.1 | 31.48 |
| Comparative Example 2 | 84.9 | 69.8 | 70.9 | 14.46 |
| Comparative Example 3 | 85.2 | 71.1 | 71.3 | 23.74 |
| Comparative Example 4 | 86.1 | 70.2 | 71.3 | 16.89 |
| Comparative Example 5 | 84.8 | 68.7 | 67.8 | 17.15 |
| Comparative Example 6 | 85.3 | 68.8 | 67.7 | 25.72 |

Referring to Tables 3 and 4, in Examples where the adsorption layer or the anode active material layer including the adsorbent particles was formed at layers that did not face the cathode of the uppermost and lowermost anodes, the gas generation was suppressed, and improved capacity retention and initial capacity efficiency were provided when compared to those from Comparative Examples.

What is claimed is:

1. A lithium secondary battery, comprising:
   an electrode assembly comprising:
      a separation layer; and
      a plurality of cathodes and a plurality of anodes separated by the separation layer and repeatedly stacked; and
   a gas adsorption layer coated only on a single surface of each of an uppermost anode and a lowermost anode among the plurality of anodes included in the electrode assembly,
   wherein each of the plurality of anodes comprises an anode current collector and an anode active material layer, and the gas adsorption layer contacts the anode active material layer.

2. The lithium secondary battery of claim 1, wherein the anode active material layer comprises
   an upper anode active material layer and a lower anode active material layer formed on a top surface and a bottom surface of the anode current collector, respectively.

3. The lithium secondary battery of claim 2, wherein the gas adsorption layer is coated on an anode active material layer that does not face a cathode adjacent to the outermost anode of the upper anode active material layer and the lower anode active material layer.

4. The lithium secondary battery of claim 3, wherein the gas adsorption layer includes gas adsorption particles, and an amount of the gas adsorption particles is from 0.1 wt % to 20 wt % based on a total weight of the anode active material layer that does not face the cathode adjacent to the outermost anode.

5. The lithium secondary battery of claim 1, wherein the gas adsorption layer includes at least one selected from the group consisting of activated carbon, soda lime, zeolite, carboxymethyl cellulose (CMC), diethanol amine (DEA), triethanolamine (TEA), N-methyldiethanolamine (MDEA) and a diene-based compound.

* * * * *